United States Patent
Baker et al.

[15] 3,698,587
[45] Oct. 17, 1972

[54] SELF SEALING COMPOSITE

[72] Inventors: Ronald E. Baker; Robert L. Fogarty; Edwin C. Slagel, all of Phoenix, Ariz.

[73] Assignee: Goodyear Aerospace Corporation, Akron, Ohio

[22] Filed: June 18, 1970

[21] Appl. No.: 47,396

[52] U.S. Cl. .................. 220/9 F, 161/161, 161/404, 161/405, 220/63 A
[51] Int. Cl. .............................................. B65d 25/18
[58] Field of Search ..... 220/63 A, 9 F; 161/404, 405, 161/161

[56] References Cited

UNITED STATES PATENTS

| | | |
|---|---|---|
| 1,406,667 | 2/1922 | Macbeth ................ 161/405 X |
| 2,246,101 | 6/1941 | McEnany ................ 161/161 |
| 2,389,210 | 11/1945 | Pitman ................ 161/161 X |
| 2,425,514 | 8/1947 | Dasher et al. ........... 220/63 A |
| 2,438,965 | 4/1948 | Dasher ............. 220/63 A UX |
| 3,526,572 | 9/1970 | Finelli ................. 161/405 X |
| 3,563,846 | 2/1971 | Harr ................. 161/405 X |

FOREIGN PATENTS OR APPLICATIONS 517,814    2/1940    Great Britain ........... 220/63 A Primary Examiner—Joseph R. Leclair
Assistant Examiner—James R. Garrett
Attorney—F. W. Brunner and J. D. Wolfe

[57] ABSTRACT

This invention relates to a self-sealing wall for containers and conduits comprising a substantially rigid supporting layer of liquid impervious material, a layer of foam and at least one layer of a homogeneous elastomeric polyurethane adhered to the foam.

1 Claim, 6 Drawing Figures

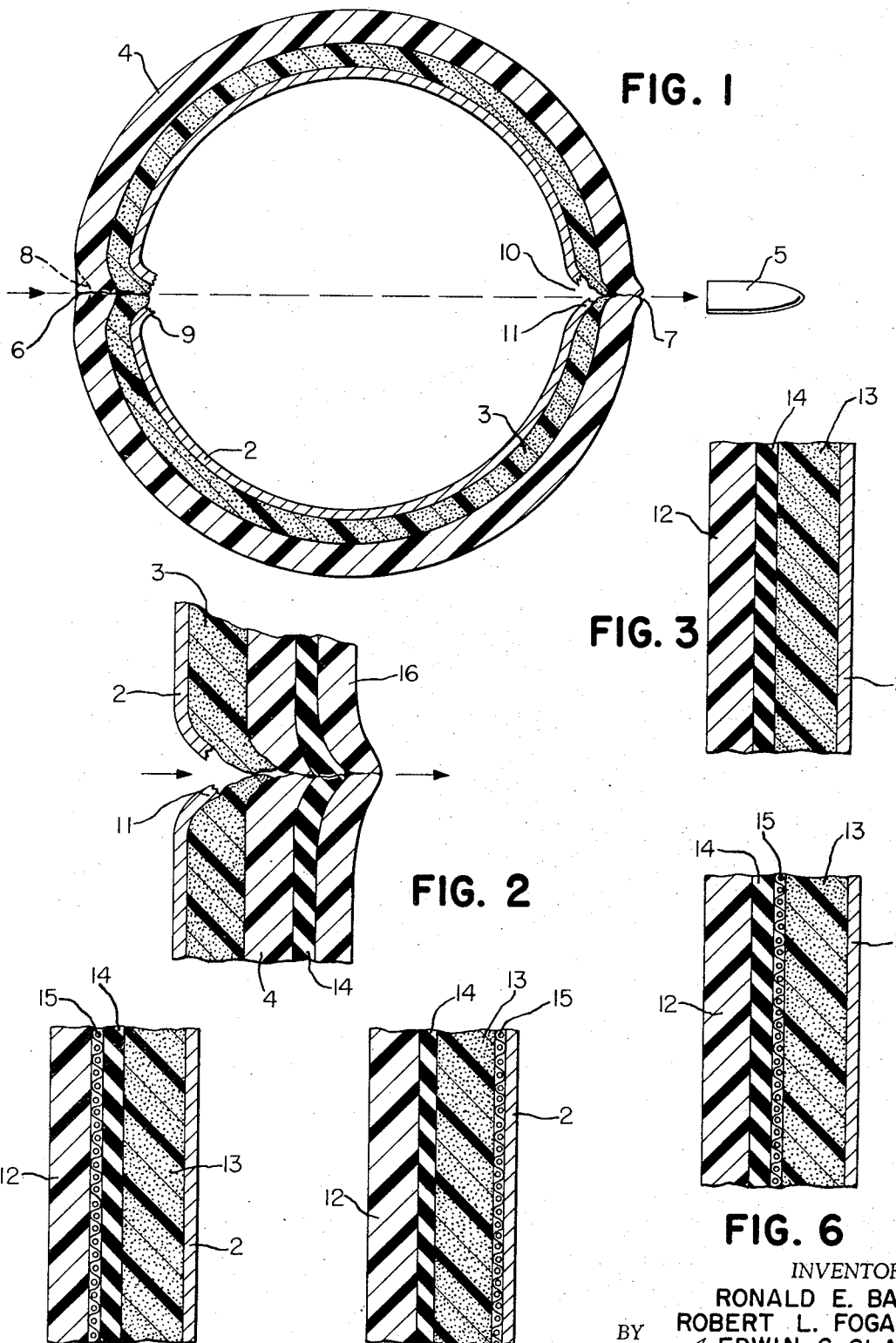

SELF SEALING COMPOSITE

This invention relates to an improvement in self-sealing fuel conduits and fuel tanks.

This problem probably first achieved a degree of urgency with the utilization of internal combustion engine driven vehicles in World War I. Although many attempts to solve this problem have been proposed, they have not completely eliminated the problem or supplied an elegant solution.

Therefore, an object of this invention is to provide a method for improving the self-sealing characteristics of fuel conduits and/or fuel tanks, particularly when said conduits and tanks are penetrated by missiles or bullets.

The specific nature of these objects and additional advantages will be more readily apparent by reference to the drawing, wherein FIG. 1 is a cross section through a fuel member containing the self-sealing characteristics of this invention;

FIG. 2 is an enlarged detail view in partial section of a puncture made by a missile as it passes outward from the conduit of FIG. 1 to show the closing action of the sealant layer;

FIG. 3 is a partial sectional view through the conduit showing another embodiment of the invention having a fuel swellable or active layer;

FIG. 4 is a partial sectional view through a conduit of another embodiment of FIG. 3 wherein a fabric reinforcing layer is used: and FIGS. 5 and 6 show other embodiments having a fabric reinforcing layer positioned therein.

Referring to FIG. 1, it will be noted that the numeral 2 in general refers to a metal conduit for a fuel line, or alternately, could be a metal tank for holding fuel. Adhered to the outside of the tube 2 is a layer 3 of a framed material where the layer is approximately 1 to 5 times as thick as the metal walls of the line and preferably about 1.5 to 2 times as thick. Spread over the foamed layer 3 is a coating of non-foamed polyurethane elastomer 4.

Referring again to FIG. 1, it will be noted that a bullet 5 is shown passing through the tank or conduit with the point of entry of the missile being shown by numeral 6 and its point of exit being designated by numeral 7. As the missile enters the conduit at the point 6 the polyurethane elastomer is forced inward and causes the sealant layer to move inward, as designated by the dashed lines identified by numeral 8, into the foam layer 3 but when the missile passes the sealant layer tends to recover its original position.

As the bullet passes through the foam layer 3 and the tank 2, it will be noted that the bullet clears the tank at this point to cause the walls of the tank or tube to project inward, as designated by the numeral 9. Although the fuel in the tank tends to flow outward as the projections or petalation 9 of the tank holds the hole open, the foam allows the sealant layer to expand and close the missile puncture.

A further advantage of the foam layer adjacent to the metal conduit 2 is seen where the bullet passes outwardly in the manner shown by numeral 10. Here the metal parts project outwardly into the foam as indicated by the numeral 11, but since the foam layer in this instance is thicker than the outward petallization of the hole by the bullet, the foam is still able to expand and partially or wholly close the hole made by the bullet to thereby reduce the rate of fuel loss by its physical blocking of the hole opening. Therefore, the rate of fuel loss through the opening is appreciably decreased by the time the fuel contacts the polyurethane member which has contracted to close the hole through the polyurethane member.

The simplest embodiment of the invention as shown in FIG. 1 shows a section through the wall of a fuel line or a tank having a substantially rigid metal wall 2, an outer layer of foam 3, and a polyurethane layer 4.

The polyurethane layer 3 used in this and other embodiments of this invention may be made by reacting an organic polyisocyanate with a reactive hydrogen-containing material having a molecular weight of about 700 to about 4000, preferably 1000 to 3000 and then curing the reaction product with a crosslinker as hereinafter described. Representative of the reactive hydrogen-containing materials are the broad classes of polyester polyols, polyether polyols, and hydrocarbon polyols. A polyester that is particularly preferred is the ester of epsilon-caprolactone with 1,6-hexanediol, 1,4-butanediol, ethylene glycol, trimethylolpropane, and mixtures of these. Any of the polyether polyols may be used. Representatives of these are the polypropylene ether polyols, preferably of 2 hydroxyls, and polytetramethylene ether polyols.

Any of the well-known organic polyisocyanates useful for making castings may be utilized with toluene diisocyanate and 4,4'-diphenylmethane diisocyanate are the ones frequently or preferably used. The polyisocyanates are normally reacted in ratios of 1.8/1-NCO/OH to 5.0/1-NCO/OH and then an extender and/or crosslinker is added to react with part or substantially all the excess isocyanate. Thus, the extender and/or crosslinker is frequently used in the amount of about .75 to 1.00 equivalents and preferably about .80 to .95 equivalents per equivalent of NCO.

Representative of the many extenders and/or crosslinkers that may be utilized are the broad classes of monomeric and polymeric polyols, organic diamines and alkylanolamines. Representative members of these classes are ethylene glycols, propylene glycols, butane diols, methylene bis-chloroaniline, methylene dianiline, bis-amine phenyl sulfone and amino-methyl propanol.

It should be appreciated that if these polyurethanes are to be applied as a reaction mixture it may be desirable to dissolve the various ingredients in suitable solvents such as the hydrocarbon solvents and the ketones and then the solution is applied preferably by casting in place but may also be applied by spraying, dipping, swabbing or brushing.

The polyurethane layer 4 is cast in place on the outside of the layer 3 of foam on the tank wall 2 by use of a mold (not shown) surrounding the tank wall 2 or alternately, it can be sprayed thereon with a suitable spray gun. Where the liquid polyurethane is poured into the space between the mold and the wall, it can be air cured or curing may be accelerated by placing the cast structure in an oven and subjecting it to heat. This same casting technique is also useful when covering a fuel line with multiple layers of polyurethane interspersed between other layers of material as hereinafter described.

The foam layer can be made from any of the elastomeric foams, representative examples being the latex foams of either natural or synthetic rubbers, polyurethane foams, polyvinyl resin foams, for instance, a polyvinyl chloride foam, and polyolefin foams. The preferred foam for use in this invention is a polyurethane foam since it is very conveniently formed in situ on the tank or conduit by application of a polyurethane foamable reaction mixture and heat and pressure to achieve foaming and cure are not required in most cases.

The polyurethane foamable reaction mixture can be made by any of the well-known techniques, for example, the one-shot, prepolymer or pseudo prepolymer methods using the polyurethane reactants enumerated above in conjunction with a blowing agent such as water or a volatile solvent of the halogenated hydrocarbon type.

The embodiment shown in FIG. 2 shows two of the layers of polyurethane elastomer 4 and 16 having sandwiched therebetween a layer of a sealant of the well-known type such as disclosed in U.S. Pat. Nos. 2,439,366, 2,440,965 and 2,446,811.

Typical polyurethane compounds useful to form layer 4 in the structure of this invention are further illustrated but not limited by the following examples, where the parts and percentages are by weight unless otherwise indicated.

EXAMPLE I

Under anhydrous conditions a mixture of 53.1 percent of the 850 molecular weight polyester of epsilon-caprolactone and 64.9 percent of methane di(phenylisocyanate) under a nitrogen atmosphere was reacted at 180° to 190° F. for about one hour to obtain a prepolymer having an amine equivalent of approximately 400. A hundred parts of the prepolymer were mixed with 10.5 parts of 1,4-butane diol. Then this mixture was cast around fuel line or tube 2 having a 0.25 inch layer of polyurethane foam thereon to fill the mold in which the fuel line was encased. The casting of about 0.25 inches around the foam covered fuel line was cured at 250° F. for 16 hours.

EXAMPLE II

Another polyurethane suitable for spray applying the polyurethane layer 4 over the foam layer on the tank is made as a prepolymer was prepared by reacting an 850 molecular weight polyester of epsilon-caprolactone with toluene diisocyanate (80/20 isomeric mixture). Then 100 parts of this prepolymer were mixed with 22 parts of 4,4-methylene bis(2-chloroaniline) in methyl ethyl ketone and immediately used to coat a fuel tank or line by spray application to give a coating over the foam layer of from about 0.1 to .3 inch thick.

It may be seen that many variations in the arrangement of the sealant and fabric layers between the polyurethane and in the number of layers may be utilized without departing from the basic concept of the invention. It also will be realized that the rigid metal layer may be made of plastic or any other suitable material of sufficient strength and stiffness for the type of fuel tank being used. In addition to covering fuel tanks this same wall structure may be used equally well on fuel lines or other containers were self-sealing characteristics are desirable.

The foam layer 3 of Examples I and II were made by forming a reaction mixture of 100 parts polypropylene triol of about 2000 molecular weight, 3.7 parts of toluene isocyanate, 2 parts of water and 3.5 parts of monofluorodichloro methane with suitable amounts of stannous octoate, a block copolymer of the alkylene silicone type (L-520) where alkylene groups are ethylene and propylene and pouring this mixture in a mold that fits around conduit or tank where it foams and cures. Alternately, the foam can be made and applied according to the teachings of Reis et al. U.S. Pat. No. 2,779,689.

It should be noted that in FIG. 3 another embodiment of the invention is shown wherein at least one polyurethane layer 12 is utilized and interspersed between the two polyurethane layers or a polyurethane layer and foam 13, a layer 14 of fuel sealing gum or swellable gum which may give added assurance and protection against loss of fuel. The swellable gum is of types well known to the art, such as lightly vulcanized natural rubber.

Referring to FIG. 4, another embodiment is shown where a reinforcing layer 15 of rubberized fabric is located between the elastomeric layer 12 and the swellable gum 14. It should be appreciated that the reinforcing layer 15 can be positioned as shown in FIGS. 5 and 6. The reinforcing layer finds particular usefulness where the fuel in the conduit is under sufficient pressure, usually about 15 to 50 pounds per square inch, and this pressure would force the elastomer to swell like a balloon. In some instances even a pound to 10 pounds pressure can produce this effect.

While certain representative embodiments and details have been shown for the purpose of illustrating the invention, it will be apparent to those skilled in this art that various changes and modifications may be made therein without departing from the spirit or scope of the invention.

What is claimed is:

1. A self-sealing wall for containers and conduits adapted to seal punctures caused by projectiles comprising
    A. a substantially rigid supporting layer of liquid impervious material;
    B. a layer of foam surrounding the rigid supporting layer; and
    C. at least one layer of a homogeneous non-foamed elastomeric polyurethane adhered to said foam layer,
        1. said polyurethane layer being the reaction product of an organic polyisocyanate and a reactive hydrogen-containing material cured with a crosslinker, and
        2. said polyurethane layer having sufficient resiliency to stretch and thereby permit passage of a projectile therethrough and then to contract to substantially seal the opening made by the projectile.

* * * * *